Nov. 7, 1939.　　　A. ANDERSON　　　2,179,169
LOCKWASHER
Filed Dec. 21, 1937
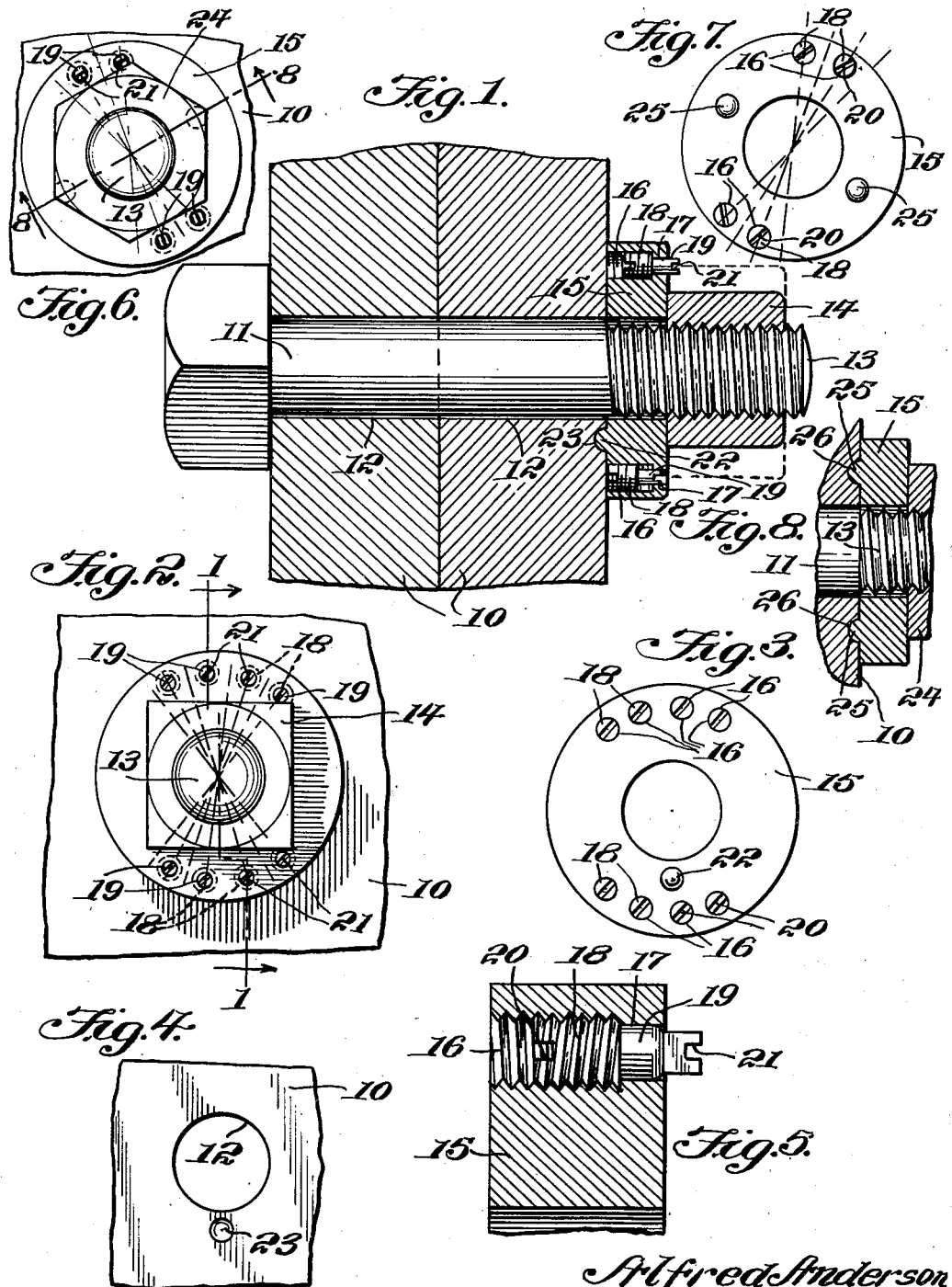
Alfred Anderson
INVENTOR
BY Victor J. Evans & Co.
ATTORNEYS
J. T. L. Wright
WITNESS Patented Nov. 7, 1939

2,179,169

UNITED STATES PATENT OFFICE 2,179,169

LOCKWASHER

Alfred Anderson, Minneapolis, Minn.

Application December 21, 1937, Serial No. 181,036

1 Claim. (Cl. 151—35)

This invention relates to lockwashers and has for an object to provide a washer having novel screws which may be backed out after the nut is screwed tight and bear against the nut to prevent accidental backing off of the nut.

A further object is to provide a lockwasher which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a longitudinal sectional view of a lockwasher constructed in accordance with the invention and in applied position, the view being taken on the section line 1—1 of Figure 2.

Figure 2 is an end elevation of the parts shown in Figure 1 showing the arrangement of the screws to bear against the nut in any position of the nut.

Figure 3 is a rear elevation of the washer showing the locking projection on the inner face of the washer.

Figure 4 is a front elevation of a portion of the work showing the socket to receive the locking projection of the washer.

Figure 5 is an enlarged detail sectional view showing one of the screws carried by the washer.

Figure 6 is a front elevation of a modified form of the invention in which the nut is hexagonal instead of square.

Figure 7 is a rear elevation of the washer shown in Figure 6 and showing the locking projections on the inner face of the washer.

Figure 8 is a detail cross sectional view taken on the line 8—8 of Figure 6 and showing the locking projection engaged in sockets in the work.

Referring now to the drawing in which like characters of reference designate similar parts in the various views, 10 designates two pieces of work to be bolted together, as for example, two plates. The bolt 11 is passed through registering openings 12 in the plate in the conventional manner. The threaded end 13 of the bolt is provided with a square nut 14 in the embodiment shown in Figure 1. For locking this nut in place a washer 15 constructed in accordance with the invention, is illustrated.

The washer 15 is provided on the inner face with a plurality of threaded openings 16 disposed parallel with the axis of the washer and extending from the inner face of the washer to a point adjacent the outer face of the washer. The smooth bore opening 17 is formed coaxial with each threaded opening 16 and opens at the inner end into the threaded opening and at the outer end opens through the outer face of the washer. This smooth bore opening is of reduced diameter with respect to the threaded opening. Each threaded opening 16 receives a screw 18 which is provided with a cylindrical stem 19 adapted to slidably and rotatably fit in the smooth bore opening 17 as best shown in Figure 5. A kerf 20 is formed in the end face of the threaded portion of the screw and a kerf 21 formed in the end face of the stem portion of the screw. The overall length of the screw is approximately the same as the thickness of the washer.

The inner face of the washer is provided with a locking projection 22 best shown in Figure 8. This projection is adapted to be received in a socket 23 formed in the work, as best shown in Figure 4, and anchors the washer against rotation when the nut is tightened.

In applying the screw 16 to the washer each screw is thrust endwise into the threaded opening with the stem 19 toward the smooth bore opening 17, and a screw driver is applied to the kerf 20 to advance the screw into the threaded opening. To lock the nut against accidental backing off a screw driver is applied to the kerf 21 in the stem end of the particular screw which may be located nearest to a wrench face of the nut and thereupon the screw may be backed out to bear against the face of the nut.

It will be noted that the screws are disposed in opposite sectors of the washer at such relative different distances from the center of the washer as to be so arranged that a screw will always be in position to engage an opposite wrench face of the nut as shown in one form of the invention, illustrated in Figure 2, and as shown in a modified form of the invention as illustrated in Figure 6, there being four faces to the nut and eight screws there will be thirty two stops on the square nut shown in Figure 2, and there being six faces to the nut and four screws there will be twenty four stops on the hexagonal nut shown in Figure 6.

In the modified form of the invention all of the parts are identically the same as above described and have been given identical reference numerals the only difference being that the nut 24 is hexagonal instead of square and the washer top is provided with a pair of locking projections 25, as best shown in Figure 7, to enter respective sockets 26 in the work as best shown in Figure 8. Also the outer end of each screw is formed square instead of round, the nut being backed against this square end after the screw is backed out sufficiently.

By referring to Figures 1 and 5 it will be seen that the threads of the screws 18 are reversed in direction with respect to the threads of the bolt 12 and nut 14. Consequently when the nut is screwed tight and the screw 18 backed out the stem 19 will project into the path of the nut and the latter engages the right side of the stem as shown in Figure 6, thus causing the screw to turn to the right, if it can. Were the threads of the screw nut reversed as described, when the nut has been jarred long enough, the screw would disappear into the washer causing the stem to be withdrawn from the path of the washer. The screw and stem are of an aggregate length of the thickness of the washer so that no projections exist on the faces of the washer to interfere with the application of a nut in the usual manner.

From the above description it is thought that the construction and operation of the invention will be fully understood without further explanation.

What is claimed is:

A lockwasher comprising a disc having an axial bolt receiving opening, there being openings in the washer concentric with the bolt receiving opening and opening through both faces of the washer, one end of each opening being threaded and the other end being reduced in diameter and smooth, said openings being arranged in pairs, the openings of each pair being disposed in opposite sectors in the washer, and short screws of an over all length of the thickness of the washer each having a threaded portion engaged in the threaded portion of a respective opening in said washer and having a reduced smooth stem disposed in the reduced smooth portion of the respective opening, there being kerfs in each end of each screw to receive a screwdriver for manipulating the screw from either end.

ALFRED ANDERSON.